United States Patent
Pillai

(10) Patent No.: US 10,672,076 B2
(45) Date of Patent: Jun. 2, 2020

(54) SYSTEM AND METHOD FOR CALCULATING PROSPECTIVE RETURN ON INVESTMENT OF ACADEMIC PERSONS IN RETURN FOR FUTURE INCOME-BASED REVENUE SHARING

(71) Applicant: Brahm Pillai, New York, NY (US)

(72) Inventor: Brahm Pillai, New York, NY (US)

(73) Assignee: Alpha Quotient LLC, New York, NY (US)

( * ) Notice: Subject to any disclaimer, the term of this patent is extended or adjusted under 35 U.S.C. 154(b) by 357 days.

(21) Appl. No.: 14/631,630

(22) Filed: Feb. 25, 2015

(65) Prior Publication Data

US 2015/0242951 A1    Aug. 27, 2015

Related U.S. Application Data

(60) Provisional application No. 61/944,188, filed on Feb. 25, 2014.

(51) Int. Cl.
*G06Q 40/00* (2012.01)
*G06Q 40/06* (2012.01)

(52) U.S. Cl.
CPC ................... *G06Q 40/06* (2013.01)

(58) Field of Classification Search
CPC ........ G06Q 40/06; G06Q 40/00; G06Q 40/12; G06Q 10/06; G06Q 10/0635
USPC ......................................................... 705/36
See application file for complete search history.

(56) References Cited

U.S. PATENT DOCUMENTS

| 5,745,885 A | * | 4/1998 | Mottola ................. G06Q 30/06 705/36 R |
| 5,809,484 A | | 9/1998 | Mottola et al. |
| 5,930,764 A | * | 7/1999 | Melchione ............. G06Q 30/02 705/7.29 |
| 7,499,872 B1 | | 3/2009 | Thompson |

(Continued)

FOREIGN PATENT DOCUMENTS

WO  PCT/US2015/017565    5/2015

OTHER PUBLICATIONS

"A Crisis in Student Loans? How Changes in the Characteristics of Borrowers and in the Institutions They Attended Contributed to Rising Loan Defaults" fall 2015 (Year: 2015).*

(Continued)

*Primary Examiner* — Bruce I Ebersman
(74) *Attorney, Agent, or Firm* — Pryor Cashman LLP

(57) ABSTRACT

A method for investing in student debt based on a specific student candidate's predicted future earnings which comprises the steps of assessing information stored in a database relating to an academic program in which the student is, was or will be enrolled in, assessing the student's academic, professional and economic potential based on information stored in a database relating to qualifications, and combining the assessments of the academic program and the student's potential to create a metric represents the desirability of the student's debt as an investment. The method is preferably executed by a computer program installed in a computer having a processor and a memory where the computer is able to store data relating to an assessment of the said academic program as well as the specific student's credentials.

16 Claims, 12 Drawing Sheets

(56) References Cited

U.S. PATENT DOCUMENTS

| | | | | |
|---|---|---|---|---|
| 8,423,452 B1* | 4/2013 | Ley | ................. | G06Q 40/02 |
| | | | | 705/38 |
| 8,620,826 B2* | 12/2013 | Coughlin | ............... | G06Q 20/40 |
| | | | | 705/75 |
| 2003/0115124 A1 | 6/2003 | Gonzalez | | |
| 2008/0281623 A1* | 11/2008 | Snyder | ................. | G06Q 40/02 |
| | | | | 705/326 |
| 2009/0138408 A1* | 5/2009 | Kincart | ................. | G06Q 40/06 |
| | | | | 705/36 R |
| 2010/0179919 A1* | 7/2010 | Madison, III | ......... | G06Q 40/06 |
| | | | | 705/36 R |
| 2011/0167019 A1* | 7/2011 | Madison, III | ......... | G06Q 40/02 |
| | | | | 705/36 R |
| 2011/0288988 A1* | 11/2011 | Vizcarrondo | .......... | G06Q 40/02 |
| | | | | 705/38 |
| 2011/0302159 A1 | 12/2011 | Mikesell et al. | | |
| 2012/0197815 A1 | 8/2012 | Cameron et al. | | |
| 2012/0290329 A1 | 11/2012 | Ross | | |
| 2013/0317966 A1* | 11/2013 | Bass | ..................... | G06Q 30/02 |
| | | | | 705/37 |
| 2014/0011180 A1* | 1/2014 | Tomaziefski | ............ | G09B 5/00 |
| | | | | 434/362 |

OTHER PUBLICATIONS

Standford Socail Innovation Review, Student finance a new frontier for impact investing (Year: 2014).*

Written Opinion of the International Searching Authority in PCT/US15/17565 (dated Aug. 30, 2016).

* cited by examiner

Figure 1A

Process 1 Inputs:
1.1 [Data] Legal name of academic institution: Weight Rank: TOP DECILE
1.2 [Data] Perceived Brand Ranking (Average of several top news periodical ratings of National Universities): Weight Rank: TOP DECILE
1.3 [Data] Type of Degree (Associate's/Bachelor's/Master's): Weight Rank: SECOND QUARTILE
1.4 [Data] Legal name of Degree Program: Weight Rank: TOP DECILE
1.5 [Data] Degree Program Faculty-to-Student Ratio: Weight Rank: TOP QUARTILE
1.6 [Data] Degree Program Educational Expenditures per Student: Weight Rank: SECOND QUARTILE
1.7 [Data] Degree Program retention rate: Weight Rank: SECOND QUARTILE
1.8 [Data] Degree Program Cost (at current value, base zero, with time value of money applied to future or prior valuation): Weight Rank: TOP DECILE
1.9 [Data] Degree Program Graduation Rate (% of students receiving degree on time): Weight Rank: SECOND QUARTILE
1.10 [Data] Degree Program Employment Rate at Graduation: Weight Rank: TOP DECILE
1.11 [Data] Degree Program Employment Rate after Graduation (within 3-12 months after): Weight Rank: TOP DECILE
1.12 [Data] Degree Program Alumni who are chief executives (per S&P 500 Companies) Weight Rank: TOP QUARTILE
1.13 [Data] Degree Program Estimated Number of Degrees Issued by Program (total since inception): Weight Rank: THIRD QUARTILE
1.14 [Data] Degree Program Estimated Number of Degrees Outstanding in Workforce (based on sample data): Weight Rank: BOTTOM QUARTILE
1.15 [Data] Degree Program Average Salary of Degree Holders in Workforce (based on sample data): Weight Rank: THIRD QUARTILE
1.16 [Data] Other Data (to be determined through analysis as reasonable indicators of wealth potential): Weight Rank: TO BE DETERMINED Process 1 Quotients:
1.1 [OUTPUT] Degree Program Average Projected Return on Investment:
1.2 [OUTPUT] Degree Program alpha quotient metric:
1.3 [OUTPUT] Degree Program alpha quotient valuation:

Figure 2A

Inputs:

2.1 [Data] YEAR ID Numerical Value of Year of Study (i.e. "0" for entering freshman, "3" for graduation senior) Weight Rank: SECOND QUARTILE 2.2 [Data] GPA Cumulative grade point average Weight Rank: TOP DECILE 2.3 [Data] Academic Program (if Person is enrolled in or has already completed a degree program) Weight Rank: TOP DECILE
a. [Data] GPA earned in program (for each program) Weight Rank: TOP DECILE 2.4 [Data] SPORT Number of registered sports per year, if any (minimum 8 week season) Weight Rank: TOP QUARTILE
a. [Data] Sport accolade per sport, if any (# of accolades) Weight Rank: SECOND QUARTILE
b. [Data] Sport accolade percentile rank, if any, (for each accolade) Weight Rank: SECOND QUARTILE 2.5 [Data] ART Number of registered arts or creative activities involved per year, if any (minimum 8 week term) Weight Rank: SECOND QUARTILE
a. [Data] ART accolade per activity, if any (# of accolades) Weight Rank: SECOND QUARTILE
b. [Data] ART accolade percentile rank, if any, (for each accolade) Weight Rank: SECOND QUARTILE 2.6 [Data] LEADERSHIP Number of registered leadership roles involved per year (minimum 8 week term) Weight Rank: SECOND QUARTILE
a. [Data] Leadership accolade per activity, if any (# of accolades) Weight Rank: SECOND QUARTILE
b. [Data] Leadership accolade percentile rank, if any, (for each accolade) Weight Rank: SECOND QUARTILE 2.7 [Data] PERCENTILE Academic performance percentile rank as compared to class Weight Rank: TOP QUARTILE 2.8 [Data] Intelligence Quotient (as input through separate timed online test) Weight Rank: TOP QUARTILE 2.9 [Data] Personal estimated savings/investment rate per year (dollars saved/invested divided by dollars earned/granted) Weight Rank: THIRD QUARTILE

Figure 2B

Process 2 Inputs Continued:

2.10 [Data] Certainty of target profession after degree program (scale of 1-10, 10 being certain) Weight Rank: THIRD QUARTILE 2.11 [Data] FICO credit score Weight Rank: THIRD QUARTILE 2.12 [Data] Standardized Test Score breakdown; Weight Rank: TOP DECILE
  a. [Data] SAT
  b. [Data] ACT
  c. [Data] SAT Subject 2.13 [Data] Number of hours worked per year (minimum 1 month term) Weight Rank: THIRD QUARTILE 2.14 [Data] Number of academic or professional recommendation letters received per year Weight Rank: THIRD QUARTILE 2.15 [Data] Current City Employment Rate (in database) Weight Rank: TO BE DETERMINED 2.16 [Data] Level of Willingness to Relocate upon graduation (scale of 1-10, 10 being highly motivated to move) Weight Rank: TO BE DETERMINED 2.17 [Data] Fitness level rating (as determined by scale of 1-10, 1 being sedentary, 10 being "Olympian-level") Weight Rank: TO BE DETERMINED
  a. [Data] Estimated Body Mass Index; Weight Rank: TO BE DETERMINED
  b. [Data] Hours per week of exercise; Weight Rank: TO BE DETERMINED 2.18 [Data] Other Data (to be determined through analysis as reasonable indicators of wealth potential): Weight Rank: TO BE DETERMINED Process 2 Quotients:

2.1 [OUTPUT] Unweighted/Raw student alpha quotient metric:

2.2 [OUTPUT] Unweighted/Raw student alpha quotient valuation:

2.3 [OUTPUT] Unweighted/Raw student alpha quotient percentile rank as compared to database:

Process 3 Quotients:

3.1 [OUTPUT] Weighted Academic Person Projected Return on Investment:
3.2 [OUTPUT] Weighted Academic Person alpha quotient metric:
3.3 [OUTPUT] Weighted Academic Person alpha quotient valuation:

| AQ Category Level | | 1st-8th Grade | High School | Bachelor's (4yr) | Grad/Prof School | Total Weight |
|---|---|---|---|---|---|---|
| 20 | IF HS & Bach & >/=2 Professional Grad ALL Complete | 0 | 0.2 | 0.7 | 1.5 | 2.4 |
| 17.5 | IF HS & Bach & >/=2 Non-Professional and 1 Professional Grad ALL Complete | 0 | 0.2 | 0.7 | 1 | 1.9 |
| 17 | IF HS & Bach & 1 Non-Professional and 1 Professional Grad ALL Complete | 0 | 0.2 | 0.7 | 0.9 | 1.8 |
| 16 | IF HS & Bach & 2 Non-Professional Grad ALL Complete | 0 | 0.2 | 0.7 | 0.8 | 1.7 |
| 17 | IF HS & Bach & Grad (Medical School) ALL Complete | 0 | 0.2 | 0.7 | 0.8 | 1.7 |
| 15.75 | IF HS & Bach & Grad (Architecture School) ALL Complete | 0 | 0.2 | 0.7 | 0.7 | 1.6 |
| 15.5 | IF HS & Bach & Grad (Law School) ALL Complete | 0 | 0.2 | 0.7 | 0.7 | 1.6 |
| 15.25 | IF HS & Bach & Grad (Business School) ALL Complete | 0 | 0.2 | 0.7 | 0.7 | 1.6 |
| 14 | IF HS & Bach & Grad (Non-professional Grad Program) ALL Complete | 0 | 0.2 | 0.7 | 0.4 | 1.3 |
| 13 | IF HS & Bach & Current Graduate Student FT (or Some Grad Complete) | 0 | 0.2 | 0.7 | 0.15 | 1.05 |
| 12 | IF HS & Bach & Current Graduate Student PT (or Some Grad Complete) | 0 | 0.2 | 0.7 | 0.1 | 1 |
| 11.5 | IF HIS & >2 Bachelors ALL Complete | 0 | 0.35 | 0.8 | 0 | 1.15 |
| 11 | IF HS & 2 Bachelors ALL Complete | 0 | 0.35 | 0.75 | 0 | 1.1 |
| 10 | IF HS & 1 Bachelors BOTH Complete | 0 | 0.35 | 0.65 | 0 | 1 |
| 9 | IF HS & Senior Yr (Current FT or Complete) | 0 | 0.4 | 0.6 | 0 | 1 |
| 8.5 | Technical School/Technical Associates Program Degree (Complete) | 0 | 0.4 | 0.6 | 0 | 1 |
| 8 | IF HS & Senior Yr (Current PT) | 0 | 0.4 | 0.6 | 0 | 1 |

Figure 3C

| AQ Category Level | | 1st-8th Grade | High School | Bachelor's (4yr) | Grad/Prof School | Total Weight |
|---|---|---|---|---|---|---|
| 7.5 | Non-technical Associates Program Degree (Complete) | 0 | 0.5 | 0.5 | 0 | 1 |
| 7 | IF HS & Junior Yr (Current FT or Complete] | 0 | 0.6 | 0.4 | 0 | 1 |
| 6 | IF HS & Junior Yr (Current PT] | 0 | 0.6 | 0.4 | 0 | 1 |
| 5 | IF HS & Sophomore Yr (Current FT or Complete] | 0 | 0.7 | 0.3 | 0 | 1 |
| 4 | IF HS & Sophomore Yr (Current PT] | 0 | 0.7 | 0.3 | 0 | 1 |
| 3 | IF HS & Freshman Yr (Current FT or Complete] | 0 | 0.8 | 0.2 | 0 | 1 |
| 2 | IF HS & Freshman Yr (Current PT] | 0 | 0.8 | 0.2 | 0 | 1 |
| 1.5 | IF HS Diploma/GED ONLY (Complete) | 0 | 1 | 0 | 0 | 1 |
| 1.25 | IF HS >50% Complete or Currently Junior/Senior | 0 | 1 | 0 | 0 | 1 |
| 1 | IF HS <50% Complete or Currently Freshman/Sophomore | 0 | 1 | 0 | 0 | 1 |
| 0.8 | IF No HS (8th Grade Complete) | 1 | 0 | 0 | 0 | 1 |
| 0.7 | 7th Grade Education | 1 | 0 | 0 | 0 | 1 |
| 0.6 | 6th Grade Education | 1 | 0 | 0 | 0 | 1 |
| 0.5 | 5th Grade Education | 1 | 0 | 0 | 0 | 1 |
| 0.4 | 4th Grade Education | 1 | 0 | 0 | 0 | 1 |
| 0.3 | 3rd Grade Education | 1 | 0 | 0 | 0 | 1 |
| 0.2 | 2nd Grade Education | 1 | 0 | 0 | 0 | 1 |
| 0.1 | 1st Grade Education | 1 | 0 | 0 | 0 | 1 |

SYSTEM AND METHOD FOR CALCULATING PROSPECTIVE RETURN ON INVESTMENT OF ACADEMIC PERSONS IN RETURN FOR FUTURE INCOME-BASED REVENUE SHARING

RELATED APPLICATIONS

This application claims priority to U.S. Provisional Application No. 61/944,188 filed Feb. 25, 2014, the disclosure of which is incorporated herein by reference.

FIELD OF THE INVENTION

Field: e-Commerce (Finance/Business/Academics/Software/Crowdfunding Platform)

This invention relates to a method and system of computer-implemented economic viability appraisal and quotient rating valuation of a person or persons (i.e. particularly current students, former students, prospective students or any other person as deemed applicable for such appraisal and valuation) ("Academic Person" or "User") and an entity (i.e. particularly pertaining to diploma or degree-granting academic institutions or academic programs, or any other non-academic entity as deemed applicable for such appraisal and valuation) ("Academic Entity") for presentation as a speculative financial asset (demonstrating "alpha" or "α" proposition) based on prospective return-on-investment after completion of diploma or degree using collected objective and subjective data, and the proposed computerized matching of Academic Persons and equity crowdfunding investors or benefactors for tuition payment partnership possibilities for said Academic Person or Academic Entity based on such computer-implemented appraisal in return for future income-based revenue sharing at fixed rate and set term codified, electronically via computer or manually via paper documentation in form of income share agreement (ISA) or other prospective wealth sharing arrangement among the Academic Person and any third-party equity crowdfunding investor or benefactor ("Investor"). Note that while the Capital Asset Model may not apply, "alpha" or "α" is used to reference future projected return on investment in excess of the cost of tuition on behalf of Academic Person(s), or the returns generated above the applicable benchmark In accordance with the present invention, "Academic Person" is herein defined as i) a person planning to attend college/degree program; ii) a student currently attending college/degree program; iii) a person who has completed a degree program; or iv) any other person as deemed applicable for such appraisal and valuation. "Academic Entity" is herein defined as a primary academic institution, a secondary academic institution, a college or degree granting program of study within school, college, institution, university or any other diploma, certificate or degree granting program.

Particularly, this invention reduces inefficiency in the current creditability or credit-worthiness appraisal of either Academic Persons or Academic Entities, or the combination thereof, for the benefit of such Academic Persons in pursuit of education. More particularly, the invention relates to a method and system for systematically or algorithmically combining tangible academic performance statistics with supplemental performance data including but not limited to intellectual, social, entrepreneurial, leadership, industrial, charitable, athletic and/or other component activity measurements that, together with the academic data, facilitate increasingly improving appraisal for projecting economic viability or determining income-potential and creditability rating for such Academic Persons or Academic Entities.

Specifically, the invention relates to a novel technique for measuring or projecting future salary, income or wealth ("Salary" or "Income" or "Wealth") capability for Academic Persons or Academic Entities. The invention is also further applicable to helping create a new asset class of Academic Persons or Academic Entities based on the valuation of projected Salary, Income or Wealth sharing streams over time.

The platform or entity utilizing the invention (the "Analyzing Entity"), integrates the invention into its primary operations in order to diligence all Academic Persons who register with the Analyzing Entity. In addition to implementing the invention, the Analyzing Entity secures commitments, ISAs, or other agreements, among the Analyzing Entity, each applicable Academic Person and each applicable Investor, via the Analyzing Entity's equity crowd funding platform or other peer-to-peer financing platform ("Platform"). Analyzing Entity issues shares or equity interests attributable to each ISA or any collection of ISAs, in exchange for respective capital allocated to the Analyzing Entity by the Investor. The Analyzing Entity manages, or oversees, all operations pertaining to the Platform including but not limited to data, systems, cash controls and contracts, or other relevant operational requirements.

BACKGROUND OF THE INVENTION

Conventional methods, processes and systems of appraisal of Academic Persons or Academic Entities consist of assessing individual Academic Person's financial and credit history or the financial and credit history of guarantors selected by such Academic Person, amongst other traditional methods of assessing financial creditability. The growth rate of student loan debt in the United States in conjunction with the US marketplace's inability to efficiently or equitably provide college graduates with paid employment positions brings rise to demand for improvement in comprehensive appraisal of Academic Persons in order to provide the marketplace with economic valuations of college degree programs and/or assessment of Academic Persons Income potential as a corollary to academic and professional data points.

Currently the decision by an undergraduate student to pursue a degree may be made at personal out-of-pocket expense or with secured loan by the Academic Person or guarantor, due to "blind-creditability" of lending institutions that provide tuition capital based on financial background of Academic Person or guarantor. The current lending market does not appear to reflect or consider the future macroeconomic implications of such respective academic program investment, nor does it appear to account for inherent economic value of prospective degree attainment for respective academic subject concentrations. Student loan debt is often incurred by Academic Persons through private bank loans or Federal loans without apparent alignment of interest amongst the Academic Person, the Academic Entity and the lending source. Although Academic Persons may graduate college with a degree, that success may be overshadowed by the looming burden of outstanding debt and its necessary repayment obligations.

For private lenders or Federal lenders, the appraisal process and/or preapproval process is typically founded upon financial metrics and certain demographic data points. While these traditional lending or tuition funding options may be adequate for some Academic Persons in the US, they are not likely adequate for certain Academic Persons who are financially unqualified to secure student loans from private lenders or Federal lender, yet they are qualified to attend and compete in target academic programs based on the present invention metrics.

In addition, the present invention preferably allows for the introduction of the valuation of the Academic Person or Academic Entity as a newly specialized speculative asset class in the form of an Income sharing agreement with the Academic Person or Academic Entities having the underlying valuation regarded as an option, derivative, guaranty bond or other type of contract, insurance policy or arrangement between such Academic Person or Academic Entity and the Analyzing Entity.

It is apparent that a need exists for a method and system whereby a current student, a prospective student, or a former student can seek market investment in himself or herself in exchange for future sharing of Income through such aforementioned agreement as implemented by the Analyzing Entity, with capital sourced from a third-party investor ("Investor"). The present invention is directed toward providing such a systematic technique for forging financial partnership among the Academic Person, the Analyzing Entity, and the Investor.

It is an object of the present invention to provide a method for an optimized and transparent systematic scoring, rating and ranking of Academic Persons or Academic Entities for introduction to the marketplace as a current or future speculative asset backed by the good faith of the Academic Entity.

It is also an object of the present invention to provide a method and a system for dynamically storing data for Academic Persons and Academic Entities in order to ensure revenue or Income sharing arrangements are honored and serviced by all parties.

These and other objects of the invention will be apparent to those skilled in the art from the description that follows.

SUMMARY OF THE INVENTION

The method and the system of the present invention are founded upon the innovative concept of using preferably at least three (3) formulaic, systematic or algorithmic process combinations of objective and subjective component data pertaining to both the Academic Persons and the Academic Entities in order to provide a computerized creditability appraisal and quotient rating of said Academic Persons and Academic Entities. The invention is a combination of processes which electronically and/or systematically generates the appraisal of Academic Persons and Academic Entities by determining a valuation in the form of quotient value and/or quotient metric based on current and/or past tangible academic performance statistics with supplemental performance data including but not limited to social, entrepreneurial, leadership, industrial, charitable, athletic, professional, artistic and/or other component activity measurements that, together with the academic data, facilitate increasingly improving appraisal for determining Income-potential, with "alpha" proposition and creditability rating for such Academic Persons or Academic Entities.

The first of the preferably at least three formulaic, systematic or algorithmic process combinations of objective and subjective component data preferably focuses on the objective of using dynamic dataset(s) to create a database of Academic Entities sortable by quotient value and/or quotient metric, or other component metrics.

The second of the preferably at least three formulaic, systematic or algorithmic process combinations of objective and subjective component data preferably focuses on the objective of producing an un-weighted or raw quotient metric rating of Academic Persons and applicable quotient metric for each, independently of the Academic Entity data.

The third of the preferably at least three formulaic, systematic or algorithmic process combinations of objective and subjective component data preferably focuses on the objective of merging the two aforementioned data points thus producing a rating and valuation of said Academic Person in the form of a weighted quotient value and/or weighted quotient metric indicating potential financial return on investment and/or the prospective alpha ("$\alpha$") valuation, and thus assisting the Analyzing Entity, Investors or general public in determining whether or not an Academic Person is a prospective match to Investors who can utilize the Analyzing Entity's quotient valuations and quotient metrics as financial risk/reward correlations, possible causations or other speculative indicators.

For example, the below three alpha categories describe examples of the types of investment propositions based on the weighted quotient metric:

Where $\alpha=0$, this is an instance where the quotient value or quotient metric calculation indicates that the cost of tuition on behalf of the Academic Person to the Academic Entity is EQUAL to the future Income share yield, plus the time valued cost of capital thus generation. Without beta metrics applied, this indicates break-even returns for investors.

Where $\alpha>0$, this is an instance where the quotient value or quotient metric calculation indicates that the cost of tuition on behalf of the Academic Person to the Academic Entity is LESS than the future Income share yield, plus the time valued cost of capital thus generation. Without beta metrics applied, this indicates positive return for investors.

Where $\alpha<0$, this is an instance where the quotient value or quotient metric calculation indicates that the cost of tuition on behalf of the Academic Person to the Academic Entity is GREATER than the future Income share yield, plus the time valued cost of capital thus generation. Without beta metrics applied, this indicates negative return for investors.

The variable data and/or component measurements will be derived from inputs collected from individuals, schools, partner entities, or from collegiate programs and are then input into the database for formulaic, systematic or algorithmic processing to yield the quotient value and/or quotient metric. Each data and/or component measurement may be assigned a beta metric within the respective formulaic, systematic or algorithmic process.

The valuation, quotient value and quotient metric will preferably be resultant of the formulaic, systematic or algorithmic process combination of the variable objective and subjective variable data of the Academic Person (i.e. student data) with the dynamic database containing the predetermined quotient value and/or quotient metric of the Academic Entity (i.e. degree program data).

The present invention preferably creates an opportunity for the Investor to regard certain Academic Persons as an asset, or a tradable security, based on resultant quotient value and/or quotient metric valuations of said Academic Persons. The Investor can extract value through a business model that creates an asset class, or tradable security, that is backed by a contract or agreement with the Analyzing Entity or another entity that in the current or potential quotient value and/or quotient metric of the Academic Person.

The present invention primarily advances the art of appraising Academic Persons and Academic Entities when analyzed together in subjective and objective relationship to future Income potential, in fundamental indifference to financial well-being of Academic Persons or guarantor to Academic Persons prior to, or during, or after, Academic Persons' enrollment in Academic Entities, and, in addition, the present invention preferably secondarily presents an improved method and system for the equitable valuation and/or quotient of alpha, and possible introduction as financial asset, or tradable security, in order to reduce fiscal dependence of Academic Persons on traditional banks, or other lenders through use of Income or Wealth sharing arrangements in the open market.

BRIEF DESCRIPTION OF THE DRAWINGS

FIG. 1A provides preferred inputs and quotients for the first of the preferably three process combinations of objective and subjective component data focusing on the objective of using a dynamic dataset to create the computer-implemented database of Academic Entities sortable by quotient value and/or quotient metric, or other component metrics;

FIG. 2A provides preferred inputs for the second of the preferably three processes combining and storing data on the Academic Persons for individualized ranking based on un-weighted quotient metrics or un-weighted quotient valuation and/or alpha proposition in preparation for combination with the Academic Entity data;

FIG. 2B provides additional preferred inputs and quotients for the second of the preferably three processes combining and storing data on the Academic Persons for individualized ranking based on un-weighted quotient metrics or un-weighted quotient valuation and/or alpha proposition in preparation for combination with the Academic Entity data;

FIG. 3A provides preferred quotients for the third of the preferably three processes merging and storing combined data on the Academic Persons with certain corresponding data on the Academic Entities for the individualized ranking of the Academic Person based on weighted quotient metrics or weighted quotient valuation and/or alpha proposition in consideration of both the Academic Person's and one or more Academic Entity's valuation;

FIG. 3B provides a chart with values for determining weight of component data in the third of the preferably three processes merging and storing combined data on the Academic Persons with certain corresponding data on the Academic Entities for the individualized ranking of the Academic Person based on weighted quotient metrics or weighted quotient valuation and/or alpha proposition in consideration of both the Academic Person's and one or more Academic Entity's valuation;

FIG. 3c is a continuation of the chart in FIG. 3b and further provides values for determining weight of component data in the third of the preferably three processes merging and storing combined data on the Academic Persons with certain corresponding data on the Academic Entities for the individualized ranking of the Academic Person based on weighted quotient metrics or weighted quotient valuation and/or alpha proposition in consideration of both the Academic Person's and one or more Academic Entity's valuation;

DETAILED DESCRIPTION OF THE DRAWINGS

Figure 1:
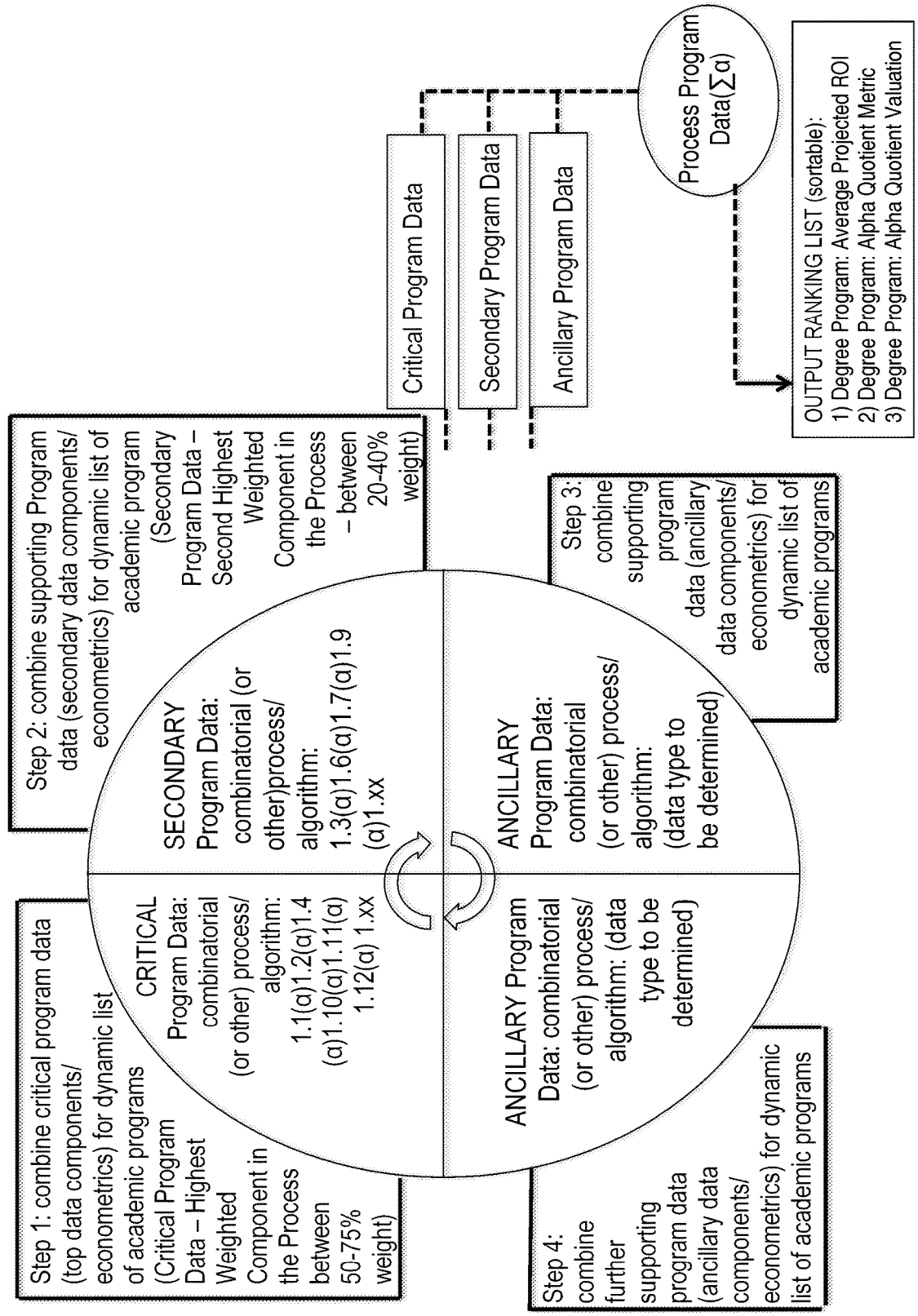
FIG. 1 illustrates the first of the preferably three process combinations of objective and subjective component data focusing on the objective of using a dynamic dataset to create the computer-implemented database of Academic Entities sortable by quotient value and/or quotient metric, or other component metrics.

FIGS. 1 and 1a illustrate, generally, the formulaic, systematic or algorithmic processes combining and storing data/econometrics on the Academic Entities for predictive or analytic assessment and ranking based on quotient metrics or quotient valuation and/or alpha proposition and to create the alpha quotient ("AQ") metric output and to rank all the available Academic Entities.

Using core academic data and/or econometrics pertaining to each Academic Entity as the primary inputs (hereinafter the "Critical Program Data") for the analytical assessment, then adding professional data inputs (hereinafter the "Secondary Program Data") and socioeconomic inputs (hereinafter "Ancillary Program Data") pertaining to the Academic Entity are combined through formulaic summation and algorithmic processing to yield the Process 1 Academic Entity AQ metric and valuation. Such academic, professional and socioeconomic data points can be weighted within the process and can include some or all of the below data points (and projected rank of weight when combined), as well as other data points to be deemed relevant.

Process 1 Academic Entity quotient database components (and rank of importance when weighted) INPUTS as seen in FIG. 1a:

1.1 [Data] Legal name of academic institution: Weight Rank: TOP DECILE
1.2 [Data] Perceived Brand Ranking (Average of several top news periodical ratings of National Universities): Weight Rank: TOP DECILE
1.3 [Data] Type of Degree (Associate's/Bachelor's/Master's): Weight Rank: SECOND QUARTILE
1.4 [Data] Legal name of Degree program: Weight Rank: TOP DECILE
1.5 [Data] Degree Program Faculty-to-Student Ratio: Weight Rank: TOP QUARTILE 1.6 [Data] Degree Program Educational Expenditures per Student: Weight Rank: SECOND QUARTILE 1.7 [Data] Degree program retention rate: Weight Rank: SECOND QUARTILE 1.8 [Data] Degree Program Cost (at current value, base zero, with time value of money applied to future or prior valuation): Weight Rank: TOP DECILE 1.9 [Data] Degree Program Graduation Rate (% of students receiving degree on time): Weight Rank: SECOND QUARTILE 1.10 [Data] Degree Program Employment Rate at Graduation: Weight Rank: TOP DECILE 1.11 [Data] Degree Program Employment Rate after Graduation (within 3-12 months after): Weight Rank: TOP DECILE 1.12 [Data] Degree Program Alumni who are chief executives (per S&P 500 Companies) Weight Rank: TOP QUARTILE 1.13 [Data] Degree Program Estimated Number of Degrees Issued by Program (total since inception): Weight Rank: THIRD QUARTILE 1.14 [Data] Degree Program Estimated Number of Degrees Outstanding in Workforce (based on sample data): Weight Rank: BOTTOM QUARTILE 1.15 [Data] Degree Program Average Salary of Degree Holders in Workforce (based on sample data): Weight Rank: THIRD QUARTILE 1.16 [Data] Other Data (to be determined through analysis as reasonable indicators of Wealth potential): Weight Rank: TO BE DETERMINED Process 1 Quotients as seen in FIG. 1a:

1.1 [OUTPUT] Degree Program Average Projected Return on Investment:

1.2 [OUTPUT] Degree Program AQ metric:

1.3 [OUTPUT] Degree Program AQ valuation:

For example, the following calculations represent one formulation for yielding Process 1 used for ranking Academic Entities. The higher the AQ score, the better performing the Academic Entity, per equals Top Ranking.

BPAQ (Basic Program AQ Scoring Formula):

The BPAQ Scoring Formula is calculated using the following formula:

$$BPAQ=WARPS*[1+((0.50*WGJP)+(0.50*WFSR))*(WAY))]*[1+CE]$$

Each value in this formula, and its weight/percentage, is calculated as follows.

WARPS (Weighted Average Rank Performance Score)

The WARPS value is calculated as follows:

a) If the Average Rank=0-10:
WARPS=(# of comparable programs in database)−((Average Rank)^1))

b) If the Average Rank=11-25:
WARPS=(# of comparable programs in database)−((Average Rank)^1.005))

c) If the Average Rank=26-50:
WARPS=(# of comparable programs in database)−((Average Rank)^1.0075))

d) If the Average Rank=51-100:
WARPS=(# of comparable programs in database)−((Average Rank)^1.01))

e) If the Average Rank=101-300:
WARPS=(# of comparable programs in database)−((Average Rank)^1.0125))

f) If the Average Rank=301-500:
WARPS=(# of comparable programs in database)−((Average Rank)^1.015))

g) If the Average Rank=501-750:
WARPS=(# of comparable programs in database)−((Average Rank)^1.0175))

h) If the Average Rank=751-1000:
WARPS=(# of comparable programs in database)−((Average Rank)^1.02))

i) If the Average Rank=1000-2000:
WARPS=(# of comparable programs in database)−((Average Rank)^1.0225))

j) If the Average Rank >2001-3000:
WARPS=(# of comparable programs in database)−((Average Rank)^1.0250))

k) If the Average Rank >3001-4000:
WARPS=(# of comparable programs in database)−((Average Rank)^1.0275))

l) If the Average Rank >4001-5000:
WARPS=(# of comparable programs in database)−((Average Rank)^1.03))

m) If the Average Rank >5001-6000:
WARPS=(# of comparable programs in database)−((Average Rank)^1.0325))

n) If the Average Rank >6001-7000:
WARPS=(# of comparable programs in database)−((Average Rank)^1.0350))

o) If the Average Rank >7001-10000:
WARPS=(# of comparable programs in database)−((Average Rank)^1.0375))

p) If the Average Rank >7001-10000:
WARPS=(# of comparable programs in database)−((Average Rank)^1.04))

CE (Cost Equalizer)

CE=10+[Tuition Cost Deviation]
[Tuition Cost Deviation]=((average tuition of comparable programs)−(program tuition))/(average tuition of comparable programs)

Note: The Weight is a normalizing value set by the admin.

50% of WGJP (Weighted Graduate Job Placement rate):
WGJP=(# of comparable programs in database)*(graduate job placement rate)*[Weight]

Note: The Weight is a normalizing value set by the admin.

50% of WFSR (Weighted Faculty:Student Ratio):
WFSR=(# of comparable programs in database)*(faculty:student percentage rate)*[Weight]

Note: The Weight is a normalizing value set by the admin.

Note: WFSR has a maximum value of 1.

WAY (Weighted Acceptance Yield) "Desirability Factor"
WAY=(Rejection Rate)*(Yield)*(PGRR)*(PAT-PEL)

Note: The Weight is a normalizing value set by the admin.

Note 2: "PGRR" is Program Graduation Rate (new field)

Alternatively, the EPAQ (Supplemental Scoring Formula) is calculated using the following formula:

$$EPAQ=BPAQ*((0.40*RF)+(0.10*AGF)+(0.15*EBF)+(0.15*CEOF)+(0.10*MOCF)+(0.05*RDGPF)+(0.05*SF))$$

Where the variables are determined by the following calculations:

35% of RF (Return Factor):
RF=1+[Average Salary Deviation]
[Average Salary Deviation]=((average Salary of program graduate)−(average Salary of comparable programs))/(average Salary of comparable programs)

10% of AGF (Alumni Giving Factor):
AGF=1+[Alumni Giving Deviation]
[Alumni Giving Deviation]=((total program annual giving)−(average comparable program giving))/(average comparable program giving)

15% of EBF (Educational Budget Factor):
EBF=1+[Educational Budget per Student Deviation]
  [Educational Budget per Student Deviation]=((program budget per student)−(average comparable program budget per student))/(average comparable program budget per student)
15% of CEOF (CEO Factor):
CEOF=1+[S&P CEO Grad Rate]
  [S&P CEO Grad Rate]=((total program S&P current CEOs)−(average comparable program S&P CEOs))/(average comparable program S&P CEOs)
10% of MOCF (Members Of Congress Factor):
MOCF=1+[Members of Congress Grad Rate]
  [Members of Congress Grad Rate]=((total program current Members of Congress)−(average comparable program Members of Congress))/(average comparable program Members of Congress)
5% of RGDPF (RDGP Factor):
RGDPF=1+[region GDP rate]
  [region GDP rate]=(main program campus region or state GDP growth rate)
5% of SF (Safety Factor):
SF=1+[School safety rating deviation]
  [School safety rating deviation]=((overall campus safety rating)−(average campus safety rating))/(average campus safety rating)

Figure 2:
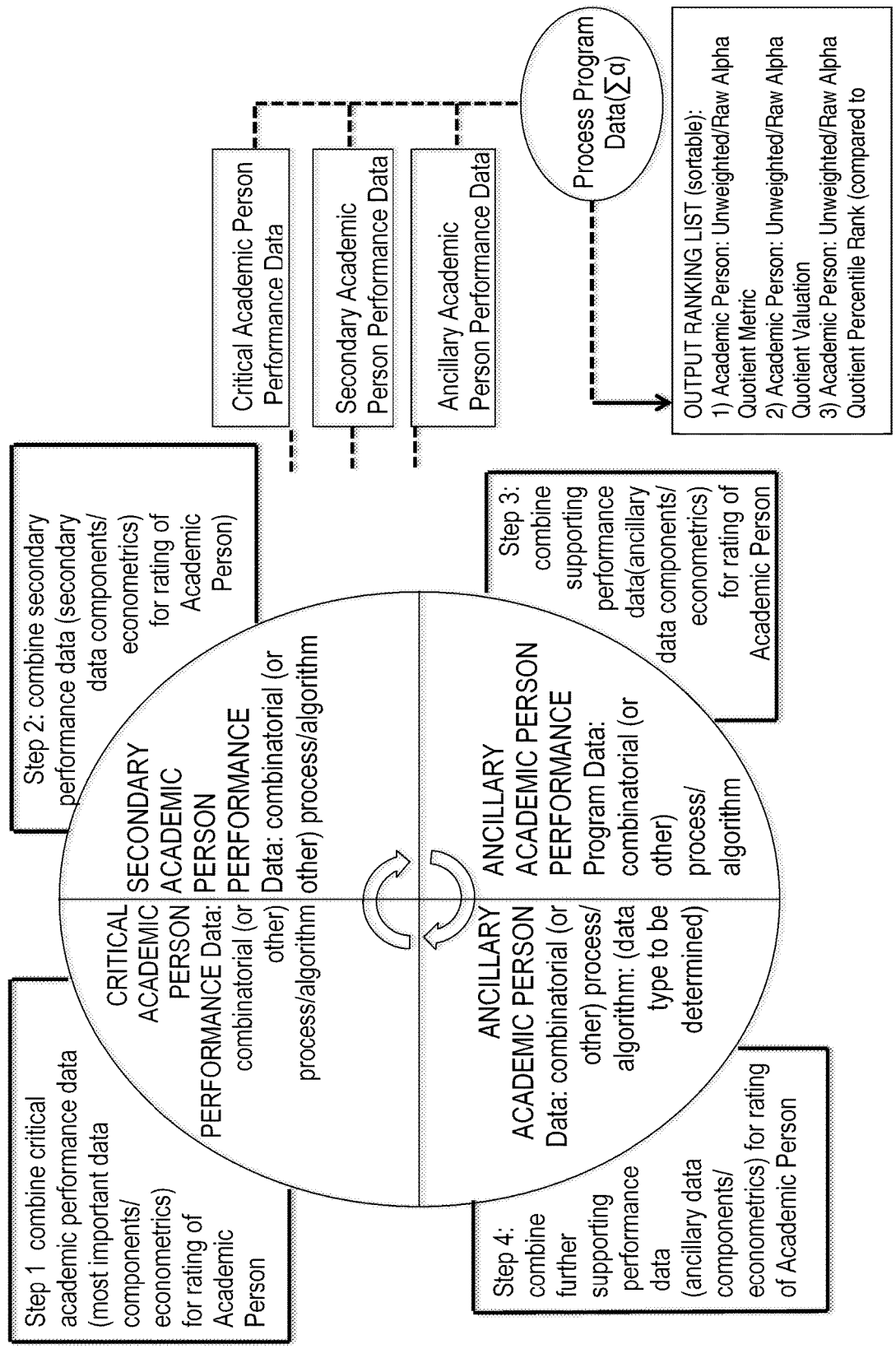
FIG. 2 illustrates the second of the preferably three processes combining and storing data on the Academic Persons for individualized ranking based on un-weighted quotient metrics or un-weighted quotient valuation and/or alpha proposition in preparation for combination with the Academic Entity data.

FIGS. 2, 2a and 2b illustrate, generally, the formulaic, systematic or algorithmic processes combining and storing data/econometrics on the Academic Person for predictive or analytic assessment and ranking based on un-weighted/raw quotient metrics or un-weighted/raw quotient valuation and/or alpha proposition in preparation of combining with existing dataset or database. Such assessment and ranking is referred to herein as "Process 2" in determining or calculating the final weighted AQ metric for the Academic Person.

Process 2 shown in FIG. 2 combines some or all of the below listed data points (and/or any other data points that may be determined to be relevant to enhancing or refining the process) to create the AQ metric output and to infer predictive or analytic assessment of the Academic Person.

Using core data or econometrics pertaining to the Academic Person's current or previous academic performance history as the primary weighted inputs (hereinafter the "Critical Academic Person Performance Data") for the analytical assessment, then adding personal, professional and socioeconomic data or econometrics pertaining to the Academic Person as supplementary weighted inputs (hereinafter the "Secondary Academic Person Performance Data"), can be combined to determine a raw AQ metric. This raw AQ metric may be adjusted through the further combination of ancillary data inputs that may include but are not limited to ethical, moral, physiological and behavioral data (herein the "Ancillary Academic Person Performance Data") of the Academic Person. The combination of all data on the Academic Person together may yield the Process 2 Academic Person un-weighted/raw quotient metric and valuation.

Academic Person quotient components (and rank of importance when weighted) INPUTS as seen in FIGS. 2a and 2b:

2.1 [Data] YEAR ID Numerical Value of Year of Study (i.e. "0" for entering freshman, "3" for graduation senior) Weight Rank: SECOND QUARTILE
2.2 [Data] GPA Cumulative grade point average Weight Rank: TOP DECILE
2.3 [Data] Academic Program (if Person is enrolled in or has already completed a degree program) Weight Rank: TOP DECILE
  a. [Data] GPA earned in program (for each program) Weight Rank: TOP DECILE
2.4 [Data] SPORT Number of registered sports per year, if any (minimum 8 week season) Weight Rank: TOP QUARTILE
  a. [Data] Sport accolade per sport, if any (# of accolades) Weight Rank: SECOND QUARTILE
  b. [Data] Sport accolade percentile rank, if any, (for each accolade) Weight Rank: SECOND QUARTILE
2.5 [Data] ART Number of registered arts or creative activities involved per year, if any (minimum 8 week term) Weight Rank: SECOND QUARTILE
  a. [Data] ART accolade per activity, if any (# of accolades) Weight Rank: SECOND QUARTILE
  b. [Data] ART accolade percentile rank, if any, (for each accolade) Weight Rank: SECOND QUARTILE
2.6 [Data] LEADERSHIP Number of registered leadership roles involved per year (minimum 8 week term) Weight Rank: SECOND QUARTILE
  a. [Data] Leadership accolade per activity, if any (# of accolades) Weight Rank: SECOND QUARTILE
  b. [Data] Leadership accolade percentile rank, if any, (for each accolade) Weight Rank: SECOND QUARTILE
2.7 [Data] PERCENTILE Academic performance percentile rank as compared to class Weight Rank: TOP QUARTILE
2.8 [Data] Intelligence Quotient (as input through separate timed online test) Weight Rank: TOP QUARTILE
2.9 [Data] Personal estimated savings/investment rate per year (dollars saved/invested divided by dollars earned/granted) Weight Rank: THIRD QUARTILE
2.10 [Data] Certainty of target profession after degree program (scale of 1-10, 10 being certain) Weight Rank: THIRD QUARTILE
2.11 [Data] FICO credit score Weight Rank: THIRD QUARTILE
2.12 [Data] Standardized Test Score breakdown; Weight Rank: TOP DECILE
  a. [Data] SAT
  b. [Data] ACT
  c. [Data] SAT Subject
2.13 [Data] Number of hours worked per year (minimum 1 month term) Weight Rank: THIRD QUARTILE
2.14 [Data] Number of academic or professional recommendation letters received per year Weight Rank: THIRD QUARTILE
2.15 [Data] Current City Employment Rate (in database) Weight Rank: TO BE DETERMINED
2.16 [Data] Level of Willingness to Relocate upon graduation (scale of 1-10, 10 being highly motivated to move) Weight Rank: TO BE DETERMINED
2.17 [Data] Fitness level rating (as determined by scale of 1-10, 1 being sedentary, 10 being "Olympian-level") Weight Rank: TO BE DETERMINED
  a. [Data] Estimated Body Mass Index; Weight Rank: TO BE DETERMINED
  b. [Data] Hours per week of exercise; Weight Rank: TO BE DETERMINED 2.18 [Data] Other Data (to be determined through analysis as reasonable indicators of Wealth potential): Weight Rank: TO BE DETERMINED 2.19

Process 2 Quotients as seen in FIGS. 2a and 2b:
  2.1 [OUTPUT] Un-weighted/raw student AQ metric
  2.2 [OUTPUT] Un-weighted/raw student AQ valuation
  2.3 [OUTPUT] Un-weighted/raw student AQ percentile rank as compared to database Alternatively, Process 2 may be calculated using the following values and formulas:

User Education Status/Level
  User inputs each level of education as an individual step in their education history (E.g. User adds HS, then adds another level for College, etc.). The Education Status/Level # is determined based on this combination of inputs.

Education Status
  As described above, this will be a combination of all added education levels. Note: A User can enter multiple instances of the same level (E.g. 2+ bachelor degrees).

User Age
  User enters "date of birth"; AQ calculates "User Age"

High School AQ Score
  Pulled from AQ Institution backend
  Should be 1000 for default (since we are not yet tracking HS entity AQ scores)

High School Graduation Date
  User enters "HS Graduation Date (MM/YYYY)" (or as suggested by computer application program interface)

Years from Today's Date to High School Graduation
  Calculate by distance in years from today's date to High School Graduation
  Negative numbers indicate graduation in past
  Positive numbers indicate not yet graduated or incomplete High School Age Factorial
  Calculates the User's deviation from the average age at the time of High School graduation
  i.e. if a User graduated in 2014 at the age of 17, and the average age is 18, the deviation is +1
  Positive deviation is additive to AQ score
  Negative deviation is subtractive to AQ score Cumulative High School GPA
  User enters "Cumulative HS GPA" (or as suggested by computer application program interface)

High School GPA Percentile
  Calculates the percentile of the User's "Cumulative HS GPA" (Column H) as compared to other users' HS GPAs in the database
  Sort an array of all HS GPA scores, ascending
  Percentile=(Index in the sorted array)*100/(total elements in the array)

SAT/ACT Score and scale(mandatory if applicable to User/education level i.e. hs student/hs grad)
  Only show if a High School has been added
  User selects the test type from drop-down:
  SAT (Max Score: 1600)
  SAT (Max Score: 2400)
  ACT (Max Score: 36)
  Two Fields: [box 1] and [box 2]
  box 1 is a User input (User's exam score) (or as suggested by computer application program interface)
  box 2 should default to the Max Score listed above, based on the respective exam selected by User, and should not be editable
  E.g. [1400] out of [1600]
  Does not repeat Percent of Perfect Score
  Calculates previous values to determine percentage of how perfect the User's SAT/ACT score is (i.e. 1400/1600=87.5% Perfect)

College AQ Score
  User selects Program(s)
  If multiple degrees are selected, calculate the average
  College AQ Score is pulled from AQ Institution backend (Academic Entities DB Table)

College Graduation Date*(mandatory if applicable to User/education level)
  User enters "College Graduation Date" (MM/YYYY) (or as suggested by computer application program interface)
  If multiple College Academic Entities are added, provide a dropdown for each program and repeat for each Years from Today's Date to College Graduation
  Calculates distance in years from today's date to College graduation
  Negative numbers indicate graduation in past
  Positive numbers indicate not yet graduated or incomplete College Age Factorial
  Calculates the User's deviation from the average age at the time of College graduation
  i.e. if a User graduated in 2014 at the age of 21, and the average age is 22, the deviation is +1
  Positive deviation is additive to AQ score
  Negative deviation is subtractive to AQ score Cumulative College GPA
  User enters "Cumulative College GPA" (or as suggested by computer application program interface)

Original Student Loan Principal (Each Program)
  User enters "Original Student Loan Principal" (if debt is applicable) for each respective degree program
  6-digit maximum, number must be >=0

Current Student Loan Balance (Each Program)
  User enters "Current Student Loan Balance" (if debt still outstanding) for each respective degree program
  6-digit maximum, number must be >=0

College GPA Percentile (all AQ Users at that Level)
  Calculates percentile of "Cumulative college GPA" (Column P) as compared to other college GPAs in the database
  Sort an array of all college GPA scores, ascending
  Percentile=(Index in the sorted array)*100/(total elements in the array)

GRE/GMAT/LSAT/MCAT/OTHER Score and Scale
  Only show if one or more Grad Schools has been added (as these are graduate school entrance exams)
  User selects the test type from drop-down:
  GRE (Max Score: 170)
  GMAT (Max Score: 800)
  LSAT (Max Score: 180)
  MCAT (Max Score: 45)
  Other
  If "Other" is chosen, show a text field for the Exam Name
  Two Fields: [box 1] and [box 2]
  box 1 is a User input (User's exam score) (or as suggested by computer application program interface)
  box 2 should default to the Max Score listed above, based on the respective exam selected by User, and should not be editable
  If "Other" is selected, box 2 should be editable
  E.g. GMAT: [700] out of [800]
  If multiple grad school Academic Entities are added, show a dropdown for each program and repeat for each (These are entrance exams, GRE/GMAT/LSAT/MCAT/OTHER (% of Perfect Score)
    Calculates previous values to determine percentage of how perfect the User's test score is (i.e. 1400/1600=87.5% Perfect)

Graduate School AQ Score
    User selects Program(s)
    If multiple degrees are selected, calculate the average)
    Grad School AQ Score is pulled from AQ Institution backend (Academic Entities DB Table)

Grad School Graduation Date
    User enters "Grad School Graduation Date" (MM/YYYY) (or as suggested by computer application program interface)

Years from Today's Date to Grad School Graduation
    Calculates distance in years from today's date to Grad School graduation
    Negative numbers indicate graduation in past
    Positive numbers indicate not yet graduated or incomplete Grad School Age Factorial
    Calculates the User's deviation from the average age at the time of Grad School graduation
    i.e. if a User graduated from Law School in 2014 at the age of 26, and the average age is 27, the deviation is +1
    Positive deviation is additive to AQ score
    Negative deviation is subtractive to AQ score Cumulative Grad School GPA
    User enters "Cumulative Grad School GPA" (or as suggested by computer application program interface Original Graduate Student Loan Principal (Each Program)
    User enters "Original Graduate Student Loan Principal" (if debt is applicable) for each respective graduate degree program
    6-digit maximum, number must be >=0

Current Student Loan Balance (Each Program)
    User enters "Current Graduate Student Loan Balance" (if debt still outstanding) for each respective graduate degree program
    6-digit maximum, number must be >=0

Grad School GPA Percentile (all AQ Users at that Level)
    AQ calculates percentile of "Cumulative Grad School GPA" (Column Y) as compared to other Grad School GPAs in database
    Sort an array of all Grad School GPA scores, ascending
    Percentile=(Index in the sorted array)*100/(total elements in the array)

Work Status
    User enters "Work Status" as presented by status code/dropdown (or as suggested by computer application program interface)

# of Full Time Jobs Since HS Graduation
    User enters "# of Full Time Jobs since HS graduation" (or as suggested by computer application program interface)

Professional License (Factor)
    User enters/selects # of professional licenses through multi-select list (or as suggested by computer application program interface)
    User should be allowed to select multiple licenses Current Salary/Income/Allowance (or Salary/Income/Allowance Range)
    User enters current Salary Current Debt Load (all Academic Entities)
    AQ calculates total debt load outstanding (sum Column R and Column AA for all Academic Entities if multiple)

Debt Factor
    AQ calculates Debt factor by: [((75−"current age")/(("current debt load"/25000)+1))/10]
    Note: "75" is fixed number (estimated maximum AQ value age); and "25000" is fixed number based on average student loan debt per capita; both factors should be consider "admin" values to be changed as need
    [((75−"Column C")/(("Column AG"/25000)+1))/10]

AQ Discretionary Factor
    This data component is a calculated metric based on individual subjective data inputs, including but not limited to: intellectual, social, entrepreneurial, leadership, industrial, charitable, athletic and/or other component activity measurements, as assessed by or collected from computer application program interface or direct User entry or another source as determined by the Analyzing Entity Process 2 might also include the following calculations using the above values:

Productivity Factor
    Productivity Factor=[((1+"Salary")/("Work Status"))/((1+(IF("distance from HS graduation"<0,("distance from HS graduation"*−1),0)/(1+"# of jobs since HS graduation"))] *("Income: Debt Ratio")
    If "distance from HS graduation" is less than zero, make it positive (multiply by −1). If larger than zero, set it to zero.

Raw AQ Score
    Raw AQ Score=
    (("HS Weight Factor"*((4^ "HSGPA")*("Percentile HS GPA"))*((1+"% of Perfect SAT/ACT")^2)+("College Weight Factor"*((4^"College GPA")*("Percentile College GPA"))+("Graduate School Weight Factor"*((1+"% of Perfect GradEntranceExam")^2)*("Percentile Grad School GPA")*((4^"GradGPA")*("Percentile GradSchool GPA")))*(SQRT("AQ User Education Level"))

Figure 3:
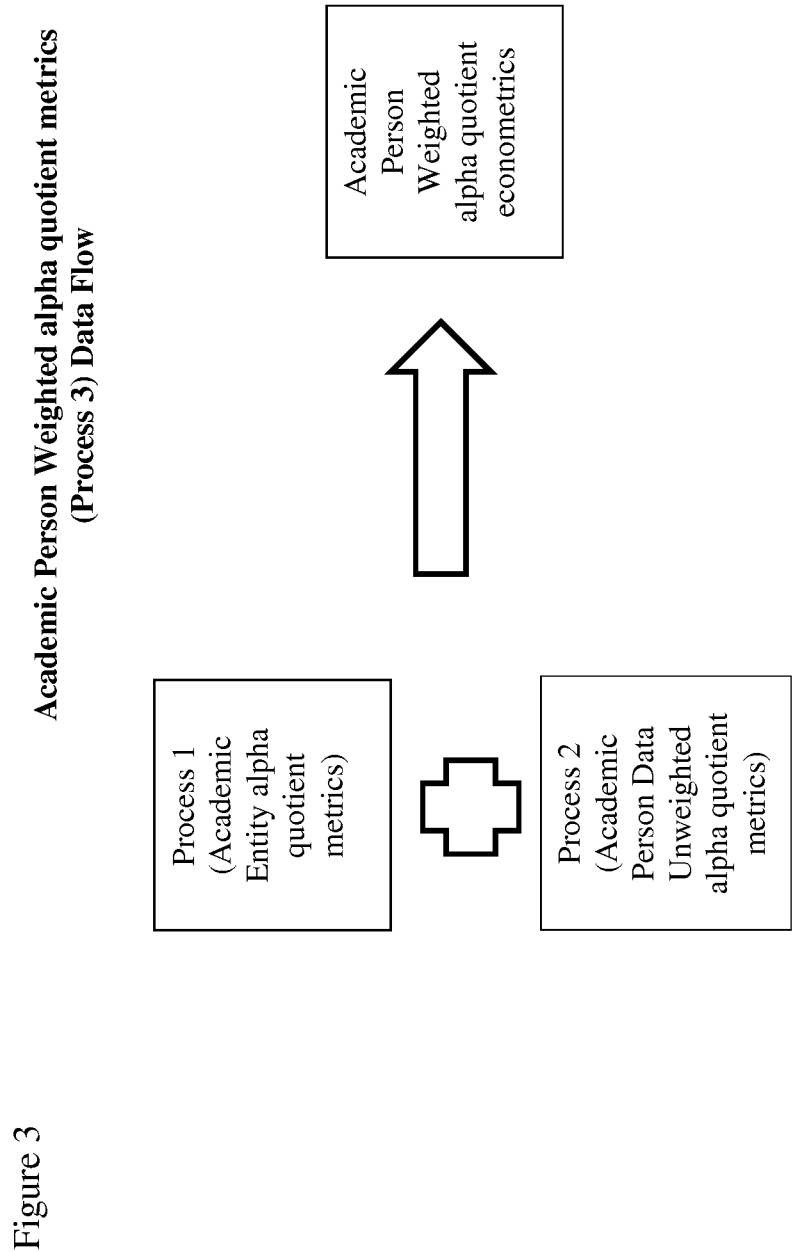
FIG. 3 illustrates the third of the preferably three processes merging and storing combined data on the Academic Persons with certain corresponding data on the Academic Entities for the individualized ranking of the Academic Person based on weighted quotient metrics or weighted quotient valuation and/or alpha proposition in consideration of both the Academic Person's and one or more Academic Entity's valuation.

FIGS. 3 and 3a illustrates, generally, the formulaic, combinatorial, systematic and/or algorithmic processes of merging and storing the AQ metrics/econometrics pertaining to the Academic Person ("Process 2" un-weighted/raw AQ) with corresponding AQ data/econometrics of the Academic Entity ("Process 1" Academic Entity quotient, or other output metrics to be determined). Such assessment and ranking is referred to herein as "Process 3" for the finalized ranking of the Academic Person based on weighted quotient metrics and/or weighted quotient valuation (i.e., "alpha proposition") in consideration of both the Academic Person's and Academic Entity's/Entities' valuation(s).

Process 3 combines or merges the two component data (Academic Entity quotient data plus Academic Person quotient data) to create the final AQ metric output and to help infer predictive or analytic assessment of the Academic Person in reference to the applicable Academic Entity.

Process 3 Quotients:
    3.1 [Data] ACADEMIC PERSON QUOTIENT DATA
        [+] (the formulaic, combinatorial, systematic and/or algorithmic process)
    3.2 [Data] ACADEMIC ENTITY QUOTIENT DATA
=Process 3 Quotients:
    3.1 [OUTPUT] Weighted Academic Person Projected Return on Investment:
    3.2 [OUTPUT] Weighted Academic Person AQ metric:
    3.3 [OUTPUT] Weighted Academic Person AQ valuation:
For example:
Jane Doe, raw→Academic Person Quotient=150
[+]
Academic Entity NYU-Stern-Bachelor of Business Administration-Class of 2001→Academic Entity=Quotient 185
    3.1 {Output} Jane Doe—User #123456789→Weighted Academic Person Projected ROI (displayed as percent of original investment)=15%*

3.2 {Output} Jane Doe—User #123456789→Weighted Academic Person alpha quotient metric (displayed as score)=179**

3.3 {Output} Jane Doe—User #123456789→Weighted Academic Person alpha quotient valuation (may be displayed as percentile or categorical valuation)="AAAA (or) 97 percentile, (or) Premium User***"

*Note: Final weighted projected ROI of 15% for Jane Doe is presented for illustration purposes only and does not infer a final systematic combination of the two component data points for the weighted AQ determination)

**Note: Final weighted AQ metric of 179 for Jane Doe is presented for illustration purposes only and does not infer a final systematic combination of the two component data points for the weighted AQ determination)

***Note: Final weighted AQ valuation of 97 percentile, Premium User, for Jane Doe is presented for illustration purposes only and does not infer a final systematic valuation of the two component data points for the weighted AQ determination)

Alternatively, Process 3 may be calculated using the following values and formulas:

Age Factorial

Age Factorial=
SUM("High School Age Factorial", "College Age Factorial", "Grad School Age Factorial")

Raw Program Weighted Member AQ

Raw Program Weighted Member AQ=
(((("HS Weight Factor"*("HS AQ Score"))+(College Weight Factor"*"College AQ Score"))+(("Grad School Weight Factor"*"Grad School AQ Score")))*(("Raw AQ Score"*(1+("Age Factorial"/100)))))

Weighted AQ

Weighted AQ=
(SQRT("Productivity Factor"))*("RAW PROGRAM WEIGHTED AQ")*(1+(SQRT("Professional License Factor")*("AQ DISCRETIONARY WEIGHT FACTOR")

Where weight of component data is determined using the chart presented in FIGS. 3b and 3c.

Figure 4:
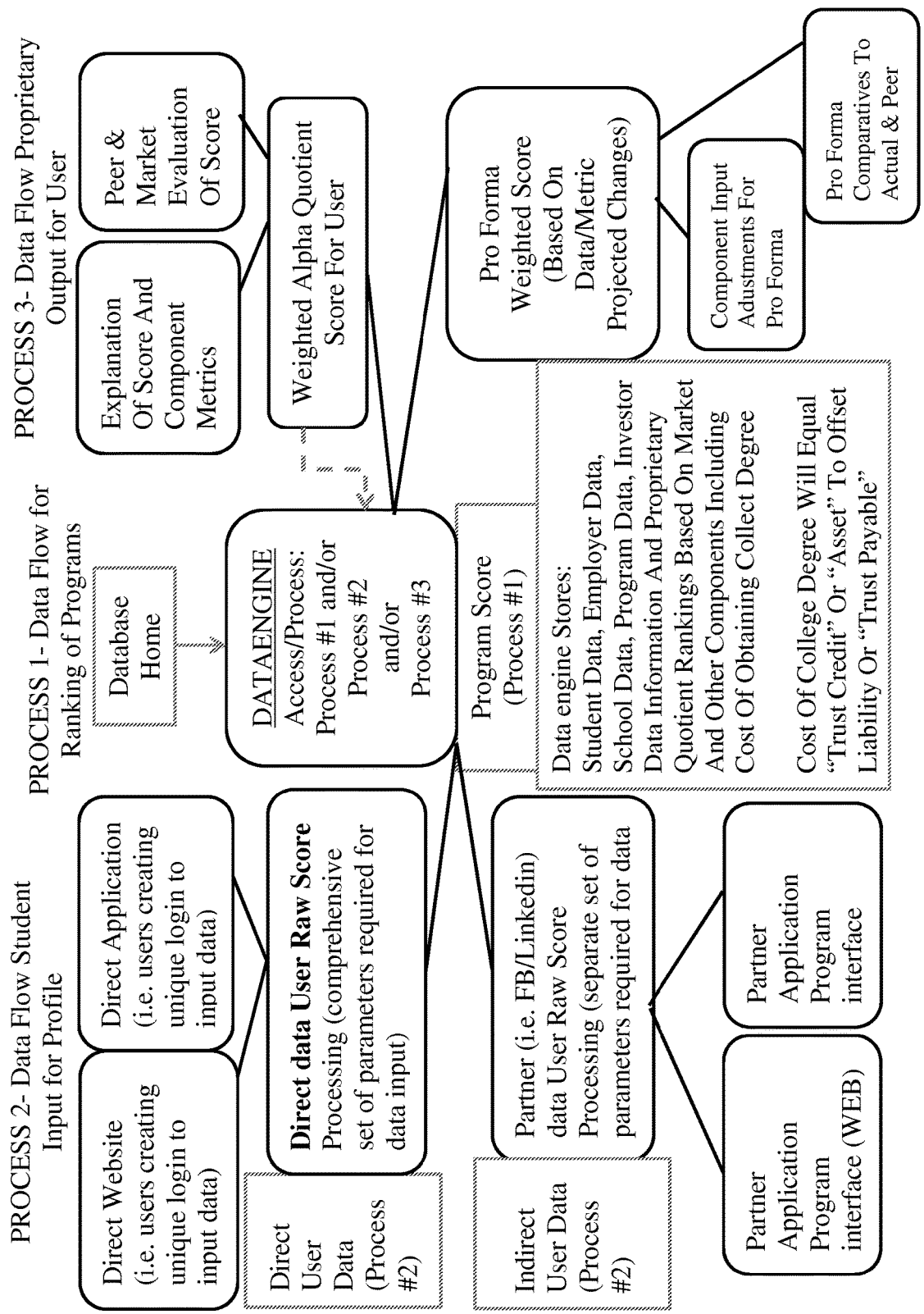
FIG. 4 illustrates the scope of the data and information flow among the preferably three processes used to determine weighted quotient metrics or weighted quotient valuation and/or the alpha proposition.

FIG. 4 illustrates, generally, the scope of the data and information flow among the three aforementioned formulaic, systematic or algorithmic processes used to determine weighted quotient metrics or weighted quotient valuation and/or the alpha proposition.

Within the flowchart in FIG. 4, the centrally managed data-engine maintains "Process 1" Academic Entity data, whether statically and/or dynamically, for consolidation of preferably all available collegiate, graduate, technical, professional program and other Academic Entities, with future Academic Entity data to include all standardized academic institutions among primary, secondary, and tertiary educational levels.

FIG. 4 also illustrates the Academic Person ("User") interface for the main database, which is described within "Process 2" and can be combined into the master database with respect to all input data points regarding the Academic Persons. Such data may be collected directly into the main database (or via partnership entity) and may be amended, removed or updated by the Academic Person.

FIG. 4 also outlines the AQ metric output phase of the data flow ("Process 3") and the general flow of data back to the User or to database partners for viewing of final processed or weighted data points.

Figure 5:
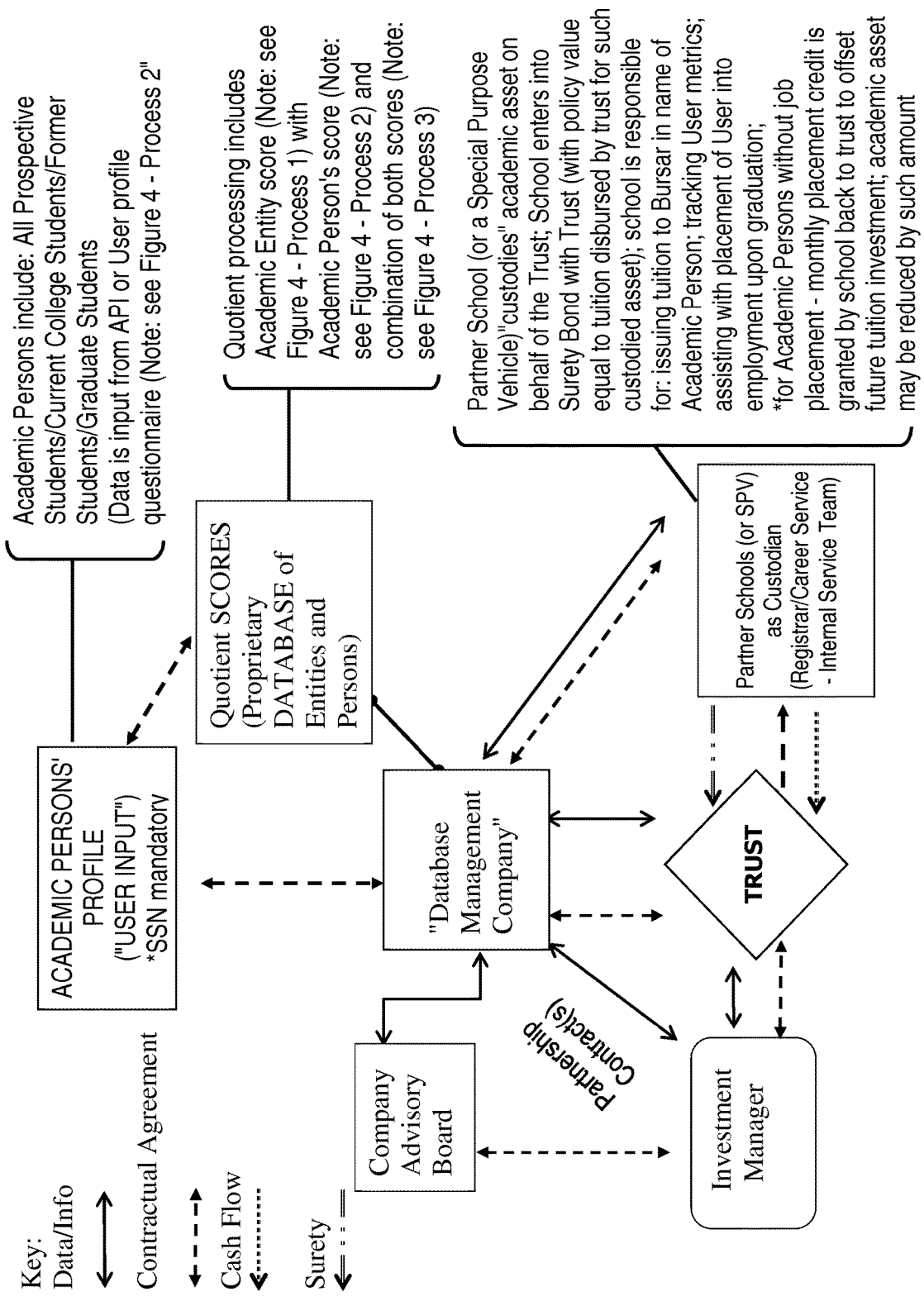
FIG. 5 illustrates the flow of business with regard to contracting, managing, and servicing investments between the Academic Persons and Academic Entities, as facilitated by the Analyzing Entity implementing the present invention.
Figure 5A:
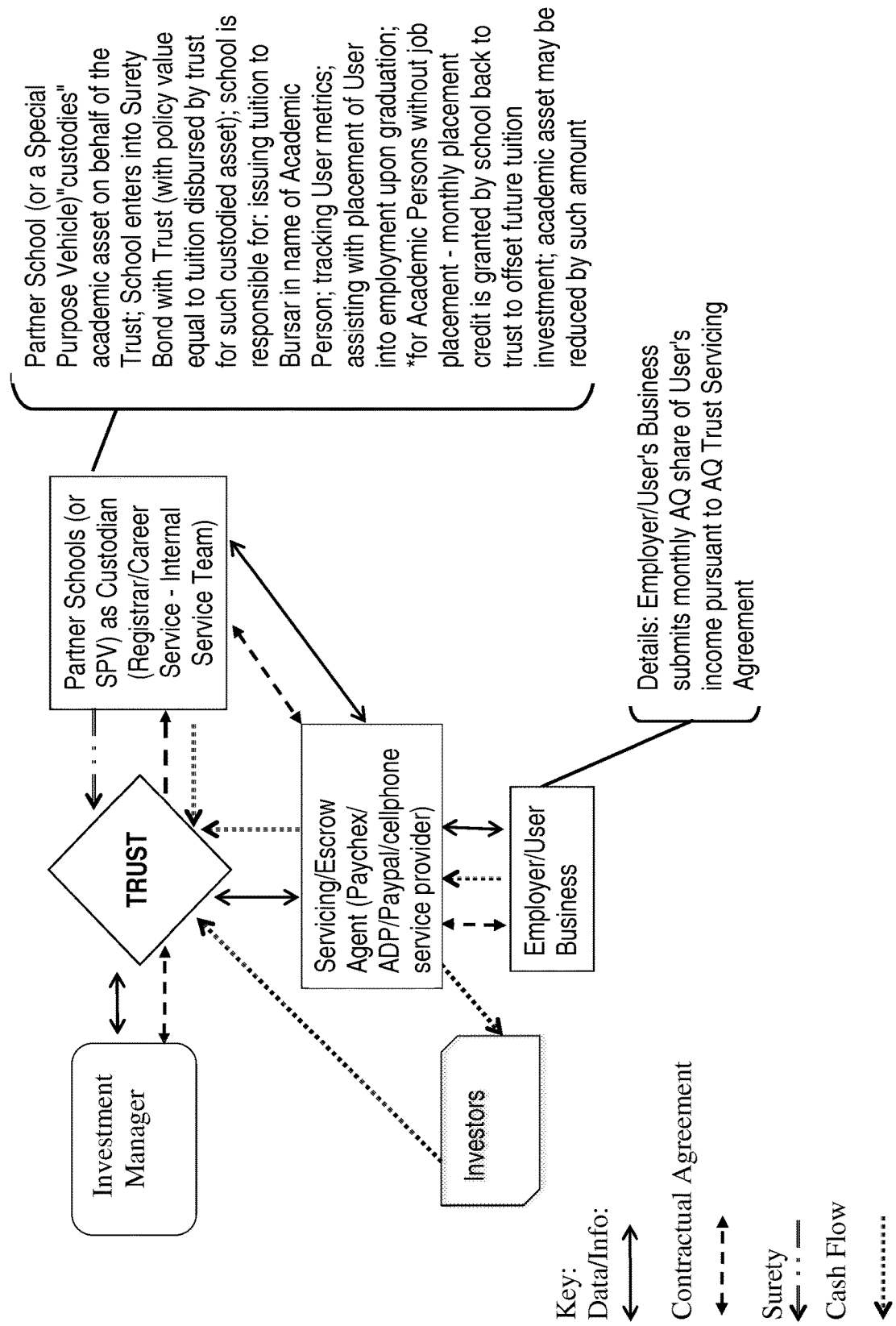
FIG. 5A illustrates the flow of business with regard to contracting, managing, and servicing investments between the Academic Persons and Academic Entities, as facilitated by the Analyzing Entity implementing the present invention.

FIGS. 5 and 5a illustrate, generally, the proposed flow of business with regard to contracting, managing and servicing investments between the Academic Persons and Academic Entities, as facilitated by the entity employing the present invention method and system, along with partners, servicers and/or contractors. FIG. 5 illustrates the relationships between Trust, the Investment Manager, Partner Schools, the Analyzing Entity, the Advisory Board, Quotient Score, and Academic Persons' Profile. FIG. 5a illustrates the relationships between Trust, the Investment Manager, Partner Schools, the Servicing or Escrow Agent, Investor, and a User's Employer or Business.

With respect to creating a central data base (as illustrated by FIG. 4), the Analyzing Entity preferably remains the central hub of all business flow among Academic Persons, Academic Entities, Investors, Fund Custodians, Service Providers, Trust entity or entities and other partners relevant to the efficient flow of data and investment, as well as maintenance or update of all data points, where necessary.

The Analyzing Entity is configured to ensure that any investment proceeds to be deployed to target Academic Persons will be managed by a Trust entity and/or by a Special Purpose Vehicle created on behalf of the Academic Entities, in order to reflect separation of database alpha quotient rating system with the investment and servicing processes.

With proper and thoughtful execution of the database, business entities and relationship management, the Academic Person can be regarded by the market as an academic asset or security, whether individually or when combined with other Academic Persons.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A method for investing in student debt based on a predicted future earnings valuation of a specific student candidate comprising the steps of:

assessing, via a centrally-managed data-engine, an academic program in which the student is, was, or will be enrolled in, based on information stored in a database relating to academic programs, said database relating to academic programs being in communication with the centrally-managed data-engine, said assessing the academic program including a ranking of the academic program compared to at least one other academic program stored in said database, wherein said information stored in said database relating to academic programs includes both objective and subjective data, wherein said database relating to academic programs is dynamic, and wherein the results of the assessments of academic programs are stored in a database;

populating, via a direct user interface of a database relating to qualifications, a first set of information relating to the student into said database relating to qualifications;

populating, via a third party social networking application program interface, a second set of information relating to the student into said database relating to qualifications, said second set of information being separate and distinct from said first set of information, wherein the second set of information includes information derived from at least one third party social networking application, wherein said information stored in said database relating to qualifications includes both objective and subjective data, and wherein said database relating to qualifications is dynamic;

assessing, via the centrally-managed data-engine, the student's academic, professional, and economic potential, based on information stored in said database relating to qualifications, including based on the first set of information and the second set of information, said database relating to qualifications being in communication with the centrally-managed data-engine, wherein said assessing the student's academic, professional, and economic potential includes determining an expected economic return on investment of the student, and wherein said ranking of academic programs is computed prior to assessing the student's academic, professional, and economic potential;

generating, via the centrally-managed data-engine, a metric representing a predicted future earnings valuation of the student, based on the assessing of the academic program and the assessing of the student's academic, professional, and economic potential; and making a recommendation to invest in the student's debt, based at least in part on the metric representing the predicted future earnings valuation of the student.

2. A method as in claim 1 where said metric is used to compare the predicted future earnings valuation of the student to the predicted future earnings valuation of other students.

3. A method as in claim 1 wherein information relating to said academic program includes at least one of the program's brand ranking, type of degree, application-weighted enrollment yield, faculty to student ratio, expenditure per student, retention rate, degree cost, graduation rate, employment rate, alumni success, number of degrees issued, or graduates' salaries.

4. A method as in claim 1 wherein the said assessing the academic program includes determining an expected economic return on investment of the program.

5. A method as in claim 1 wherein the said information relating to the student's qualifications includes at least one of the student's year of study, grade point average, completed degrees, extracurricular activities, intelligence quotient, estimated savings, FICO credit score, certainty of target profession after graduation, standardized test scores, recommendation letters, current city employment rate, willingness to relocate after graduation, or fitness level.

6. A method as in claim 1 further including the step of entering the student's information relating to student's qualifications through a user interface.

7. A method as in claim 6 wherein the student has a unique account access by a unique login and into which he can enter his information and view his profile, scores, and rankings.

8. A method as in claim 1 further comprising the steps of:
posting by a crowdfunding recipient information based on said metric; and
receiving by said crowdfunding recipient funds from crowdfunding inventors.

9. A system for investing in student debt based on a predicted future earnings valuation of a specific student candidate comprising:
a computer having a processor and a memory;
an academic program valuation stored in said memory;
a student valuation stored in said memory;
a computer program executable by said computer for accessing said academic program valuation and said student valuation, said computer program configured to:

assess, via a centrally-managed data-engine, an academic program in which the student is, was, or will be enrolled in, based on information stored in a database relating to academic programs, said database relating to academic programs being in communication with the centrally-managed data-engine, said assessing the academic program including a ranking of the program compared to at least one other academic program stored in said database, wherein said information stored in said database relating to academic programs includes both objective and subjective data, wherein said database relating to academic programs is dynamic, and wherein the results of the assessments of academic programs are stored in a database;

populate, via a direct user interface of a database relating to qualifications, a first set of information relating to the student into said database relating to qualifications;

populate, via a third party social networking application program interface, a second set of information relating to the student into said database relating to qualifications, said second set of information being separate and distinct from said first set of information, wherein the second set of information includes information derived from at least one third party social networking application, wherein said information stored in said database relating to qualifications includes both objective and subjective data, and wherein said database relating to qualifications is dynamic;

assess, via the centrally-managed data-engine, the student's academic, professional, and economic potential, based on information stored in said database relating to qualifications, including based on the first set of information and the second set of information, said database relating to qualifications being in communication with the centrally-managed data-engine, wherein said assessing the student's academic, professional, and economic potential includes determining an expected economic return on investment of the student, and wherein said ranking of academic programs is computed prior to assessing the student's academic, professional, and economic potential;

generate, via the centrally-managed data-engine, a metric representing a predicted future earnings valuation of the student, based on the assessing of the academic program and the assessing of the student's academic, professional, and economic potential; and make a recommendation to invest in the student's debt, based at least in part on the metric representing the predicted future earnings valuation of the student.

10. A system as in claim 9 where said metric is used to compare the predicted future earnings valuation of the student to the predicted future earnings valuation of other students.

11. A system as in claim 9 wherein information relating to said academic program includes at least one of the program's brand ranking, type of degree, application-weighted enrollment yield, faculty to student ratio, expenditure per student, retention rate, degree cost, graduation rate, employment rate, alumni success, number of degrees issued, or graduates' salaries.

12. A system as in claim 9 wherein the said assessing the academic program includes determining an expected economic return on investment of the program.

13. A system as in claim 9 wherein the said information relating to the student's qualifications includes at least one of the student's year of study, grade point average, completed degrees, extracurricular activities, intelligence quotient, estimated savings, FICO credit score, certainty of target profession after graduation, standardized test scores, recommendation letters, current city employment rate, willingness to relocate after graduation, or fitness level.

14. A system as in claim 9 further including the step of entering the student's information relating to student's qualifications through a user interface.

15. A system as in claim 14 wherein the student has a unique account access by a unique login and into which he can enter his information and view his profile, scores, and rankings.

16. A system as in claim 9 wherein the said computer program is capable of performing the further steps of:
   posting by a crowdfunding recipient information based on said metric; and
   receiving by said crowdfunding recipient funds from crowdfunding inventors.

* * * * *